US006248448B1

(12) United States Patent
Lippey et al.

(10) Patent No.: US 6,248,448 B1
(45) Date of Patent: Jun. 19, 2001

(54) ANTI-REFLECTION FILM

(75) Inventors: Barret Lippey; Hiroichi Ishikawa, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/283,795

(22) Filed: Apr. 1, 1999

Related U.S. Application Data

(63) Continuation-in-part of application No. 08/674,884, filed on Jul. 3, 1996, now abandoned.

(30) Foreign Application Priority Data

Jul. 6, 1995 (JP) .................................................. P07-170925

(51) Int. Cl.[7] .............................. B32B 17/06; B32B 9/04; B32B 27/06; B32B 9/00
(52) U.S. Cl. ........................ 428/432; 428/446; 428/480; 428/500; 428/689; 428/697; 428/698
(58) Field of Search ..................................... 428/457, 689, 428/697, 698, 432, 446, 500, 480, 621; 359/581, 585; 313/479, 474, 635

(56) References Cited

U.S. PATENT DOCUMENTS

| 4,264,133 | 4/1981 | Sakurai | 350/164 |
|---|---|---|---|
| 4,422,721 | 12/1983 | Hahn et al. | 350/164 |
| 4,732,454 | 3/1988 | Saito et al. | 350/164 |
| 4,870,322 | 9/1989 | Matsudaira et al. | 313/506 |
| 5,091,244 | 2/1992 | Biornard | 428/216 |
| 5,190,807 | 3/1993 | Kimock et al. | 428/216 |
| 5,298,312 | 3/1994 | Oyama et al. | 428/216 |
| 5,318,830 | 6/1994 | Takamatsu et al. | 428/216 |
| 5,407,733 | 4/1995 | Bjornard et al. | 428/216 |
| 5,464,683 | 11/1995 | Rudigier et al. | 428/216 |

*Primary Examiner*—Paul Thibodeau
*Assistant Examiner*—Holly C. Rickman
(74) *Attorney, Agent, or Firm*—Sonnenschein, Nath & Rosenthal

(57) ABSTRACT

An anti-reflection film having high electrical conductivity and high anti-reflection effect over a wide frequency range despite its simplified structure. The anti-reflection film has two mutually neighboring layers which are deposited directly or via a hard coating layer on a supporting layer. A first layer of the layers that is closer to a supporting layer is formed of an electrically conductive material capable of absorbing light, while the remaining second layer is formed of a material having a refractive index not higher than 2.0. If the first layer has the refractive index and the extinction coefficient for a shorter wavelength $\lambda_v$ of $n_v$ and $k_v$, respectively, and the refractive index and the extinction coefficient for a longer wavelength $\lambda_r$ of $n_r$ and $k_r$, respectively, $n_v$ is larger than $n_r$ and $k_v$ is smaller than $k_r$ ($n_v > n_r$ and $k_v < k_r$).

6 Claims, 12 Drawing Sheets

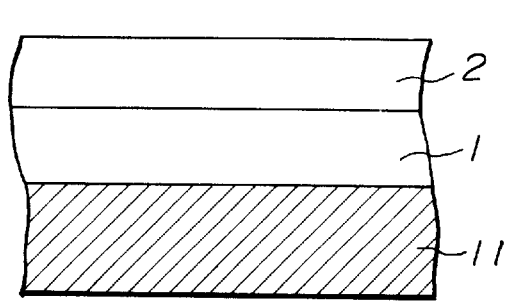
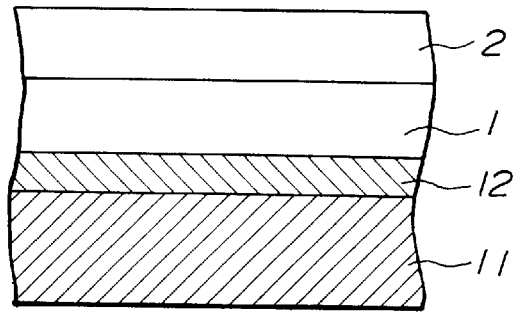
FIG.1A  FIG.1B
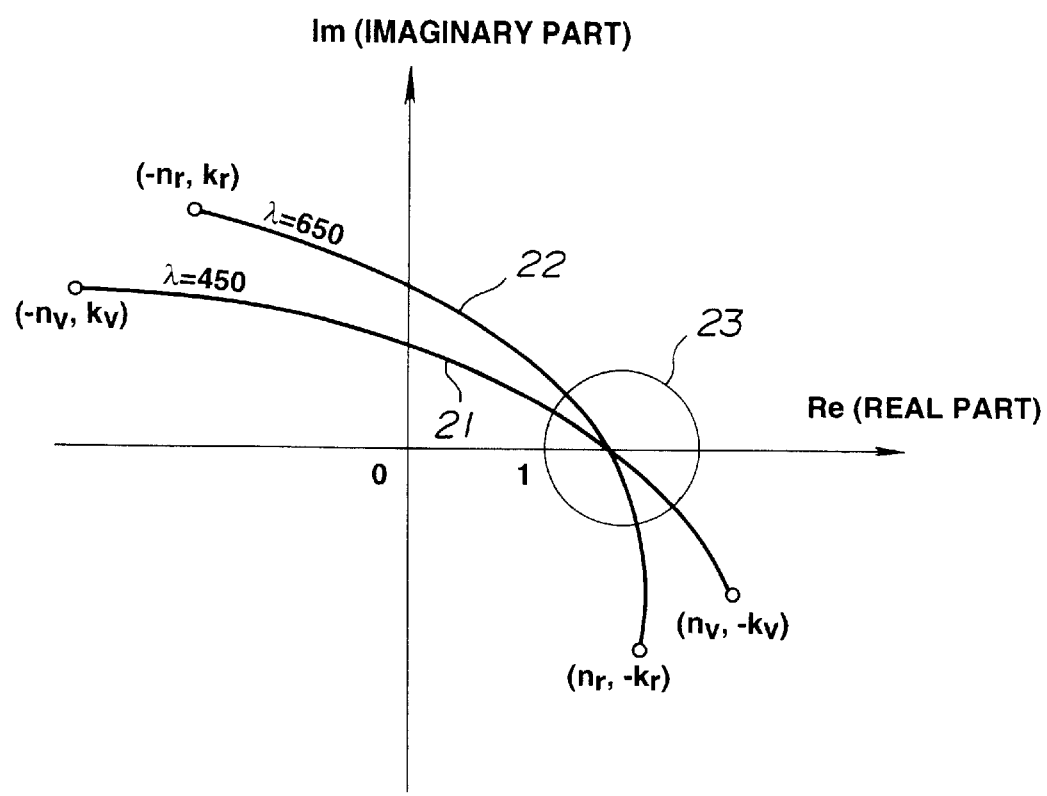
FIG.2

ANTI-REFLECTION FILM

CROSS-REFERENCE TO RELATED APPLICATION

This is a continuation-in-part of U.S. Ser. No. 08/674,884, filed Jul. 3, 1996 abandoned.

BACKGROUND OF THE INVENTION

This invention relates to an anti-reflection film as an optical film deposited on a supporting layer and configured for having anti-reflection properties and for preventing leakage of electro-magnetic waves or accumulation of static charges.

DESCRIPTION OF RELATED ART

Up to now, an anti-reflection film has been extensively used in the field of optical or opto-electrical application where it is desired or necessary to decrease the reflection from an optical boundary between, for example, air and glass. Examples of such application include a camera lens, a platen for a copying machine, a cover glass for equipment, a panel for a cathode ray tube and other display devices.

Among optical thin-film coatings, employed in a variety of application fields, there are a sole coating layer of a film composed of magnesium fluoride, a dual-layer coating which minimizes the refractive index in a wavelength range, and a multi-layer broad-range coating producing a low refractive index over a broader wavelength range, such as a visible range.

The dual-layer coating is now explained.

A dual-layer anti-reflection film, as disclosed in U.S. Pat. No. 4,422,721 (anti-reflection film A), is made up of at least one layer of a low refractive index material, such as magnesium fluoride, a thin transparent layer of an electrically conductive high refractive index material, such as indium tin oxide (ITO), cadmium stannate or tin antimony oxide. This dual-layer anti-reflection film is made up of the layer of low refractive index material and the thin transparent layer of the electrically conductive high refractive index material, deposited in this order on the surface of an optical substrate. The layer of the electrically conductive material has an optical thickness of 1.0 to 30.0 nm, while the layer of the low refractive index material has a film thickness correlated with the thickness of the layer of the electrically conductive material for prohibited deterioration of the layer of the electrically conductive material.

The dual-layer anti-reflection film A, made up of a film of low refractive index material and a high refractive index material, provides a directly electrically connectable electrically conductive anti-reflection film which may be used with advantage for a CRT or copying machine.

A dual-layer anti-reflection film, disclosed in U.S. Pat. No. 4,732,454 (anti-reflection film B), is made up of a transparent substrate of a synthetic material, a hard scratch-proof first layer deposited on the substrate, a second layer of an electrically conductive material, intimately affixed to the first layer and formed by vacuum deposition or sputtering by high frequency discharge at a temperature lower than 150° C. in the presence of oxygen atoms and a third layer formed of a material having a lower refractive index than that of the second layer and intimately affixed to the second layer. The second layer is comprised of ITO as its ingredient.

The anti-reflection film B can propagate light and can be coated on a protective layer of a synthetic material so as to serve as an anti-reflection film suitable as a filter with respect to electromagnetic waves emanating from the CRT filter.

The above anti-reflection film A leaves much to be desired in that it is lower in electrical conductivity and in reflection inhibiting ratio over a wide frequency range.

Similarly to the anti-reflection film A, the above anti-reflection film B leaves much to be desired in that it is lower in reflection inhibiting ratio over a wide frequency range.

If the anti-reflection film low in electrical conductivity is attached to a panel for CRT, it has only little effect in preventing static charges or inhibiting an output of electro-magnetic waves from being outputted from a CRT panel.

SUMMARY OF THE INVENTION

It is therefore an object of the present invention to provide an anti-reflection film having high electrical conductivity and high reflection inhibiting ratio in a broad frequency range.

An anti-reflection film according to the present invention has two mutually neighboring layers which are deposited directly or via a hard coating layer on a supporting layer. One of the layers that is closer to a substrate layer is formed of an electrically conductive material capable of absorbing light, while the remaining second layer is formed of a material having a refractive index not higher than 2.0. If the first layer has the refractive index and the extinction coefficient for a shorter wavelength $\lambda_v$ of $n_v$ and $k_v$, respectively, and the refractive index and the extinction coefficient for a longer wavelength $\lambda_r$ of $n_r$ and $k_r$, respectively, $n_v$ is larger than $n_r$ and $k_v$ is smaller than $k_r$ ($n_v > n_r$ and $k_v < k_r$).

If the first layer is generated in the presence of oxygen with an oxygen partial pressure of not more than 50%, the amount of generation of oxides may be reduced for reducing deterioration in electrical conductivity.

According to the present invention, there is provided an anti-reflection film having high electrical conductivity and high anti-reflection effect over a wide frequency range despite its simplified structure, thus prohibiting static charges or electro-magnetic waves from being outputted from an optical substrate on which is affixed the anti-reflection film.

BRIEF DESCRIPTION OF THE DRAWINGS

FIGS. 1A and 1B are partial cross-sectional views illustrating essential portions of anti-reflection films embodying the present invention;

FIG. 2 is a graph showing an example of an admittance diagram for illustrating the selecting principle of the first layer of the anti-reflection films shown in FIGS. 1A and 1B;

DESCRIPTION OF THE PREFERRED EMBODIMENTS

Figure 3:
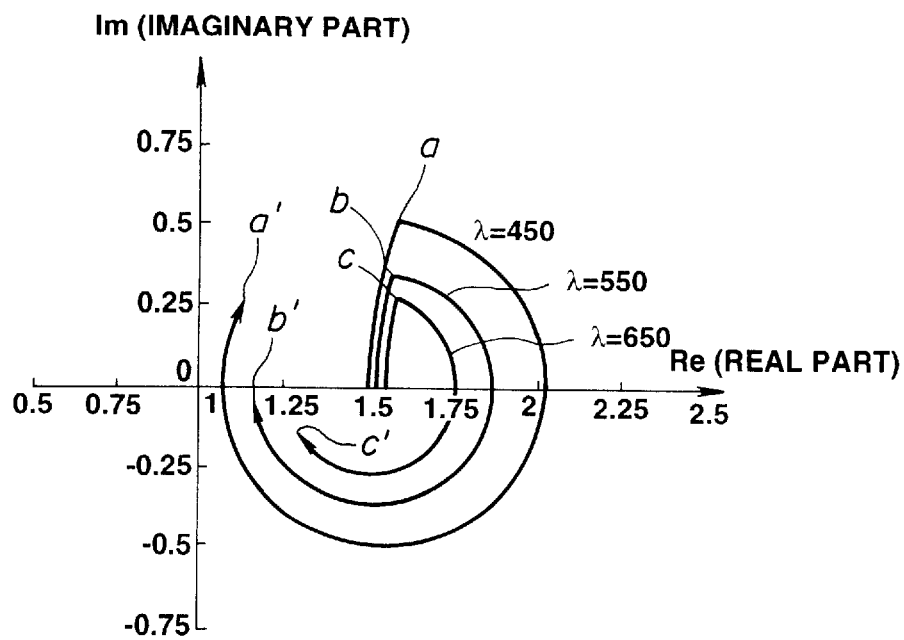
FIG. 3 is a graph showing an admittance diagram of a conventional $TiO_2$—$SiO_2$ anti-reflection film.

Referring to the drawings, preferred embodiments of the present invention will be explained in detail.

The anti-reflection film is directly deposited on the surface of an optical substrate for diminishing the amount of reflected light from the optical substrate surface and exhibits electrical conductivity on the surface of the optical substrate. Also, the anti-reflection film is deposited on a flexible supporting layer of, for example, polyethylene terephthalate (PET) so as to serve as an anti-reflection film sheet which is bonded on a display surface, such as glass surface, of a display apparatus comprised of a cathode ray tube (CRT). Alternatively, the anti-reflection film is directly deposited on the display surface at the time of manufacture of the CRT of the display apparatus for suppressing the glaring reflected light from the display surface or suppressing emission of electro-magnetic waves or static charges to a minimum. In addition, since only two thin-film layers suffice, the anti-reflection film takes only a small amount of material and can be furnished at a low cost.

The anti-reflection film of the present invention has two features, namely that it exhibits anti-reflection characteristics using a light-absorbing material with the refractive index n and the extinction coefficient k, and that optical characteristics in the wavelength range are thereby broadened thus enabling a broader wavelength range for the anti-reflection film with a smaller number of component films than with the conventional multi-layer film.

The above-mentioned flexible supporting layer is used as a supporting layer 11, and the anti-reflective film is made up of a first layer 1 and a second layer 2, looking from the side closer to the supporting layer 11, as shown in FIG. 1A. Alternatively, a hard coating, or a hard coat layer 12, is first formed on the supporting layer 11, and a first layer 1 is formed on the hard coat layer 12, as shown in FIG. 1B.

Among the conditions of selecting the first layer 1 are low cost, high adhesion to the surface of the optical substrate, high durability, low stress, and an adjustable optimum refractive index n or extinction coefficient k. Among the conditions of selecting the second layer 2 are low cost, low refractive index, low stress, hardness and high durability.

As a principle of the present embodiment, optimum optical characteristics will be explained using the principle of the admittance diagram.

The optical admittance is generally given as a complex number. If units are selected appropriately, the real part may be numerically equated to the refractive index n of the space or a substance allowing passage of light, while the imaginary part may be numerically equated to the extinction coefficient of the above space or the substance.

In addition, each point representing admittance follows the admittance diagram as later explained, and is characteristic of the substance employed, while being dependent on the thickness of the substance traversed by the light.

FIG. 2 shows an admittance diagram of TiN$_x$ and SiO$_2$ on a glass substrate as later explained. In FIG. 2, n$_v$ and k$_v$ denote the refractive index and extinction coefficient for a wavelength λ=450 nm, respectively, while n$_r$ and k$_r$ denote the refractive index and extinction coefficient for a wavelength λ=650 nm. The loci of movement of the admittance values pass through a point (1.52, 0) on the glass substrate on the real axis so as to be converged with increased film thickness at points (n$_v$, -k$_v$), (n$_r$, -k$_r$).

For TiN$_x$, a curve 21 passing through points (-n$_v$, k$_v$) and (n$_v$, -k$_v$) and the aforementioned pre-set point (1.52, 0) represents the above admittance diagram for a wavelength λ=450 nm. On the other hand, a curve 22 passing through points (-n$_r$, k$_r$) and (n$_r$, -k$_r$) and the aforementioned pre-set point (1.52, 0) represents the above admittance diagram for a wavelength λ=650 nm.

On the other hand, the admittance diagram for SiO$_2$ is obtained as a curve 23 which is a circle with a radius of 0.56 and with a center at ((1.46$^2$+1)/2,0)=(1.56, 0).

In forming a dual-layer film, the locus of movement of the admittance may be formed by combining curves 21, 22 and 23.

FIG. 3 shows an admittance diagram of an anti-reflection film in which the first layer is a film of titanium dioxide (TiO$_2$) and the second layer is a film of silicon dioxide (SiO$_2$) termed a V-coat. Meanwhile, TiO$_2$ is higher in refractive index, while SiO$_2$ is lower in refractive index and larger in film thickness than TiO$_2$.

FIG. 3 shows an admittance diagram of the anti-reflection film of the dual-layer film (TiO$_2$—SiO$_2$) for incident visible light beams with wavelength λ of 450 nm, 550 nm and 650 nm. For example, for the wavelength λ=450 nm, the locus of movement when the light passes through TiO$_2$ is denoted by the locus of movement beginning at near n=1.52 and ending at a point a lying at a one-o'clock position, while the locus of admittance when the light passes through SiO$_2$ is denoted by an arc locus of movement beginning from the point a and ending at a point a' lying at a 10-o'clock position. For the wavelength λ=550 nm, the locus of movement when the light passes through TiO$_2$ is denoted by the locus of movement beginning at a starting point and ending at a point b, while the locus of admittance when the light passes through SiO$_2$ is denoted by a locus of movement beginning from the point b and ending at a point b'. Similarly, for the wavelength λ=650 nm, the locus of movement when the light passes through the TiO$_2$ is denoted by the locus of movement beginning at a starting point and ending at a point c while the locus of movement of admittance when the light passes through SiO$_2$ is denoted by a locus of movement beginning from the point c and ending at a point c'.

As may be seen from the admittance diagrams of the (TiO$_2$—SiO$_2$) anti-reflection film, since the distance of movement of the locus of movement of the admittance when the light passes through the first and second films differs with the wavelength λ of the incident light, the coordinates of the end points a', b' and c' of the respective loci of movement are not constant. From this it may be said that, if the wavelength of the incident light is varied, the optical film thickness QWOT (quarter wave of optical thickness; an optical thickness represented with λ/4 as a unit) of the TiO$_2$—SiO$_2$ is changed. That is, if the light having a wavelength from 450 to 650 nm is incident, it may be predicted that there exists reflected light depending on the wavelength, with the light volume being correspondingly changed.

In this respect, it is difficult with the anti-reflection film made up of the dual-layer film to prevent reflection of light of a broad wavelength range, such that improvement is desired.

Figure 4:
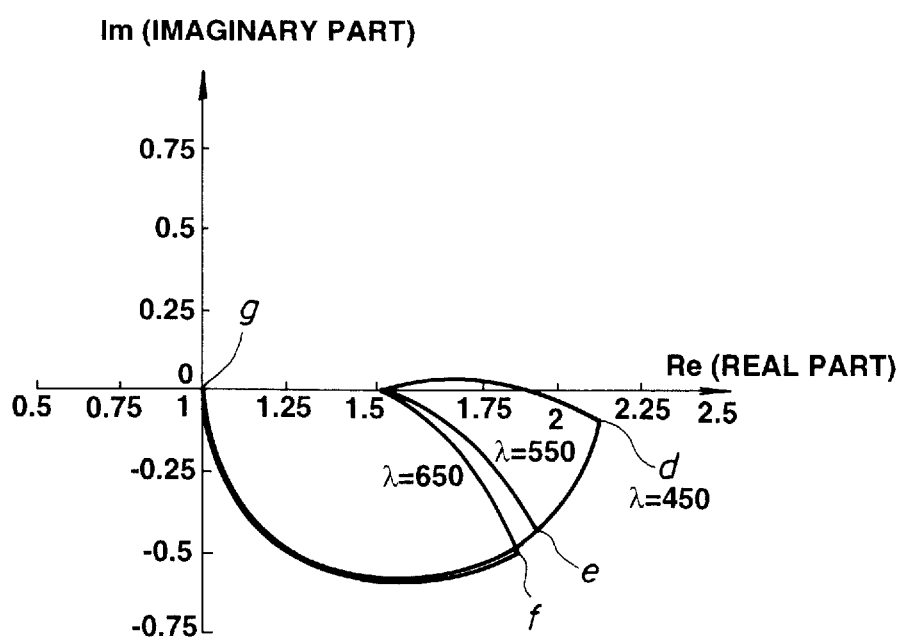
FIG. 4 is a graph showing an admittance diagram of an ITO/Au—$SiO_2$ anti-reflection film embodying the present invention.

In an embodiment of the present invention, the above-mentioned first layer is made up of indium tin oxide (ITO) and gold (Au) and the second film is formed of SiO$_2$. FIG. 4 shows an admittance diagram of this ITO/Au—SiO$_2$ anti-reflection film. The first layer is constituted so that the refractive index $n_{11}$ of ITO and the refractive index $n_{12}$ of gold Au account for 60% and 40%, respectively, of the refractive index of the first layer, that is so that the refractive index $n_1$ of the first layer is $n_1=0.6n_{11}+0.4n_{12}$. The first layer has a film thickness of, for example, 12.8 nm, while the second layer has a film thickness of, for example, 77.8 nm.

The method of finding the admittance diagram is now explained. In a multi-layer film, the effect of the respective layers is represented by the following equation (1):

$$\begin{vmatrix} \cos\delta, & (i\sin\delta)/y \\ iy\sin\delta, & \cos\delta \end{vmatrix} \quad \text{where } \delta = 2\pi Nd\cos\theta/\lambda. \tag{1}$$

In the above equation (1), N in the equation for δ (δ=2πNd cos θ/λ) denotes complex refractive index and is represented by N=n−ik were n and k represent the refractive index and the extinction coefficient of each layer, where i is a unit of an imaginary number, with $i^2$=−1. That is, N is a value corresponding to the optical admittance y. On the other hand, θ is an angle of incidence which becomes equal to zero for vertical incident light (θ=0), while d denotes a film thickness.

For obtaining the combined admittance of the multi-layer film in its entirety, calculations of the following equation (2):

$$\begin{vmatrix} B \\ C \end{vmatrix} = \left( \pi_{h=1}^{q} \begin{vmatrix} \cos\delta_h, & (i\sin\delta_h)/y_h \\ iy_h\sin\delta_h, & \cos\delta_h \end{vmatrix} \right) \begin{vmatrix} 1 \\ y_m \end{vmatrix} \tag{2}$$

are performed.

In the equation (2), $y_m$ denotes the admittance of the substrate. The combined optical admittance or combined admittance is found by Y=C/B.

Returning to the anti-reflection film of the dual-layer film (ITO/Au—SiO$_2$), the ITO—Au layer constituting the first layer is a metal layer with a gold color admixed with an electrically conductive oxide and which exhibits different light absorption depending on the wavelength λ of the incident light. The admittance describes loci of movement different as far as the points d, e and f for the wavelengths λ=450 nm, 550 nm and 650 nm, as shown in FIG. 4. the points d, e and f are located at respective different positions and are varied depending on physical properties of the first layer, such as the type of the materials used for the first layer or the thickness of the first layer, or the wavelength of the light incident on the first layer.

The locus of movement of the admittance of the SiO$_2$ layer are from the points d, e and f to the point g. The point g is (1, 0), from which it is seen that the (ITO/Au—SiO$_2$) anti-reflection film has an admittance which goes to 1, that is, completely inhibits reflection, no matter which wavelength range of at least the visible light is incident thereon.

By arranging this first layer as the light absorbing layer, and by determining the physical properties of the first layer based on the admittance diagram of the second layer, an anti-reflection film is realized which is made up only of the first and second layers and which substantially completely prohibits reflection of light in the visible range.

Figure 5A:
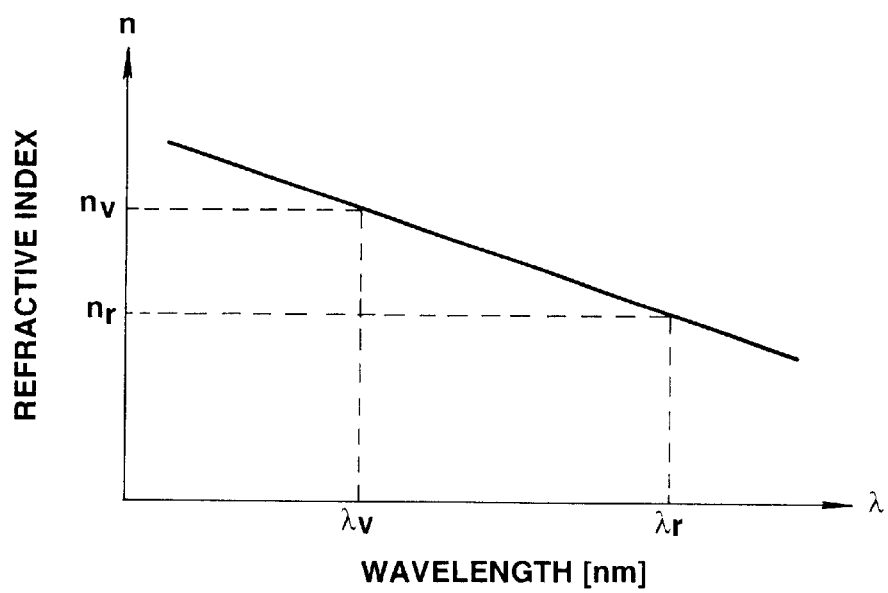
FIG. 5A is a graph showing the relation between the refractive index of the first layer of the anti-reflection film and the wavelength.
Figure 5B:
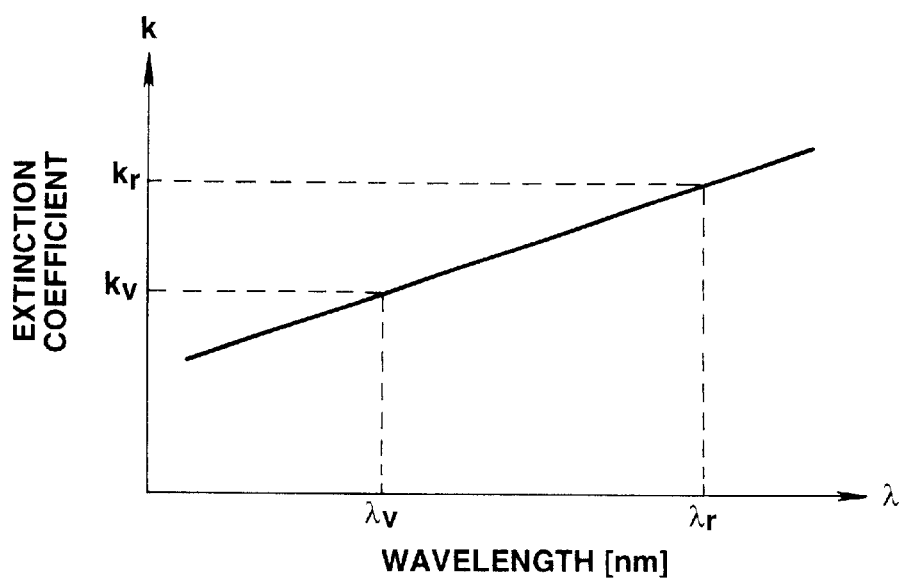
FIG. 5B is a graph showing the relationship between the wavelength and the extinction coefficient of the first layer of the anti-reflection film.

If the conditions of the materials constituting the first layer are selected so that the admittance diagram shown in FIG. 2 can be delineated, that is if the shorter wavelength side and the longer wavelength side of selected two wavelengths are denoted as wavelength $\lambda_v$ and $\lambda_r$, and if, in the above first layer, the refractive index and the extinction coefficient for the wavelength $\lambda_v$ are denoted as $n_v$ and $k_v$, respectively, while the refractive index and the extinction coefficient for the wavelength $\lambda_r$ are denoted as $n_r$ and $k_r$, respectively, the relation between the wavelength λ and the refractive index n is represented by a straight line having a negative gradient, as shown, for example, in FIG. 5A, while the relation between the wavelength λ and the extinction coefficient k is represented by a straight line having a positive gradient, as shown, for example, in FIG. 5B. That is, the following inequalities (3):

$$n_v > n_r \text{ and } k_v < k_r \tag{3}$$

are met.

The relation between the wavelength λ and the refractive index n and that between the wavelength λ and the extinction coefficient k need not be linear as shown in FIGS. 5A and 5B, it being only sufficient if the relation of the inequalities (3) are met.

Among other materials satisfying the inequalities (3) are gold (Au), copper (Cu) and titanium nitrides (TiN$_x$), where x>0.

TABLE 1

|  |  | refractive index [n] | extinction coefficient [k] |
|---|---|---|---|
| Au | 450 nm | $n_v$ = 1.4 | $k_v$ = 1.9 |
|  | 650 nm | $n_r$ = 0.15 | $k_r$ = 3.2 |
| Cu | 450 nm | $n_v$ = 1.2 | $k_v$ = 2.4 |
|  | 650 nm | $n_r$ = 0.21 | $k_r$ = 3.7 |
| TiN$_x$ | 450 nm | $n_v$ = 2.4 | $k_v$ = 1.2 |
|  | 650 nm | $n_r$ = 1.7 | $k_r$ = 1.8 |

The first layer may be constituted by a titanium nitride (TiN$_x$), zirconium nitride (ZrN$_x$) and a mixture of titanium nitride and zirconium nitride, where x>0.

The first layer may also be constituted by at least one of titanium oxynitrides ($TiN_xO_y$), zirconium oxynitrides ($ZrN_xO_y$) and zirconium oxynitrides ($ZrN_xO_y$), where x>0 and y>0.

As a modification of the present invention, an anti-reflection film of a dual-layer film ($TiN_x(W)$—$SiO_2$), employing a film of titanium nitride ($TiN_x(W)$), having tungsten (W) introduced therein as impurities, as the first layer, and also employing a film of $SiO_2$ as the second layer, is now explained by referring to the drawings. For the first layer, preferably 0<x≦1. FIGS. 6 to 9 are admittance diagrams of the anti-reflection film comprised of the dual-layer film ($TiN_x(W)$—$SiO_2$). As for the first layer ($TiN_x(W)$), the proportion of tungsten W to titanium Ti is set to 0.6 atom % by carrying out sputtering with tungsten (W) bonded on titanium Ti used as a target. The value of x is set by setting the partial pressure values of argon Ar and nitrogen $N_2$ in a flow gas used for forming the first layer by sputtering so as to be 87% and 13%, respectively, for example.

Figure 6:
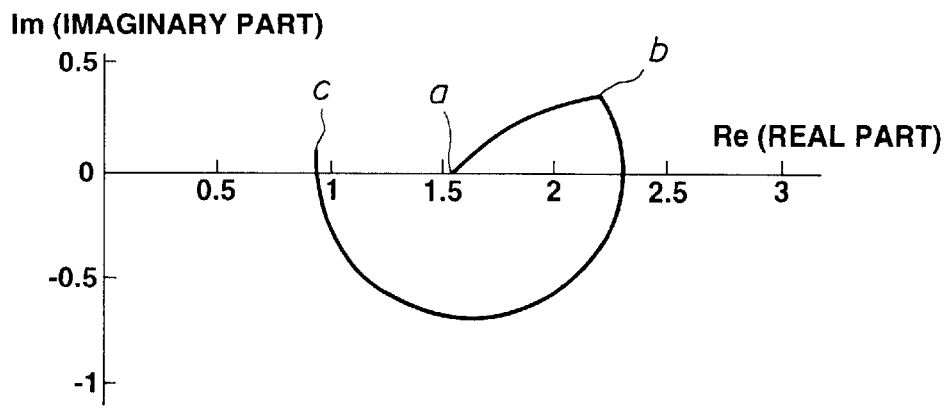
FIG. 6 is a graph showing an admittance diagram for the wavelength $\lambda$ of 405 nm of a $TiN_x(W)$—$SiO_2$ anti-reflection film embodying the present invention.
Figure 7:
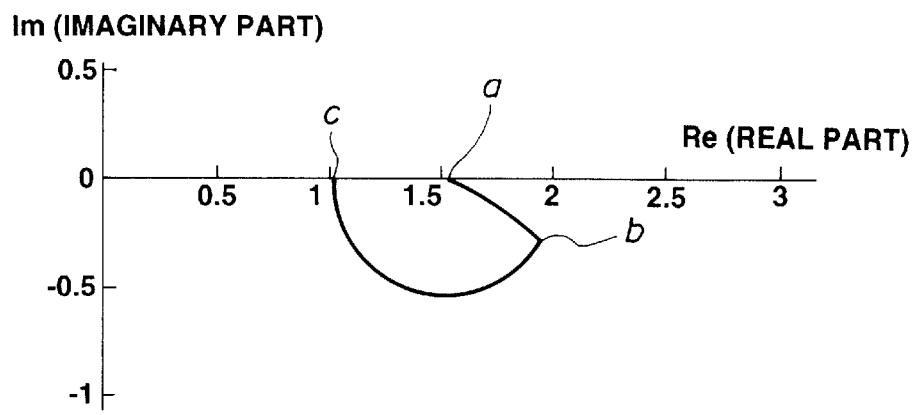
FIG. 7 is a graph showing an admittance diagram for the wavelength $\lambda$ of 546 nm of the $TiN_x(W)$—$SiO_2$ anti-reflection film of the present invention.
Figure 8:
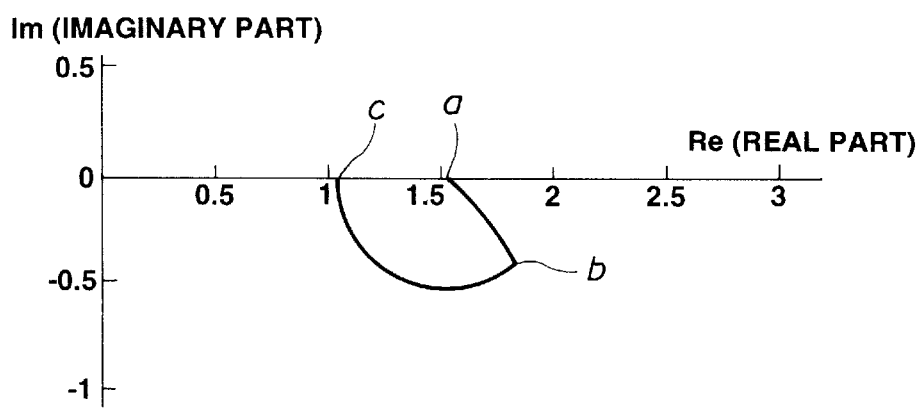
FIG. 8 is a graph showing an admittance diagram for the wavelength λ of 633 nm of the TiN$_x$(W)—SiO$_2$ anti-reflection film of the present invention.

FIGS. 6 to 8 illustrate the cases in which the incident visible light beams have different wavelength values λ. That is, FIGS. 6, 7 and 8 illustrate admittance diagrams for λ=405 nm, λ=546 nm and λ=633 nm, respectively. The anti-reflection film constituted by this dual-layer film $TiN_x(W)$—$SiO_2$ is made up of the first layer $TiN_x(W)$ with a film thickness of 9.93 nm and the second layer $SiO_2$ with a film thickness of 82.81 nm sequentially deposited on a glass substrate having a refractive index $n_0=1.52$ and the extinction coefficient $k_0=0$. If λ=405 nm in FIG. 6, the refractive index $n_1$ and the extinction coefficient $k_1$ of the first layer are 2.5 and 0.73, respectively, whereas, if λ=546 nm in FIG. 7, the refractive index $n_1$ and the extinction coefficient $k_1$ of the first layer are 1.58 and 1.49, respectively and, if λ=633 nm in FIG. 8, the refractive index $n_1$ and the extinction coefficient $k_1$ of the first layer are 1.16 and 1.74, respectively. As for the second layer, the refractive index $n_2$ and the extinction coefficient $k_2$ of the first layer are 1.45 and 0, respectively, without regard to the wavelength. In FIGS. 6 to 8, curves from point a to point b represent the loci of movement of the admittance when the light passes through the first layer $TiN_x(W)$, while curves from point b to point c represent the loci of movement of the admittance when the light passes through the second layer $SiO_x$.

In FIGS. 6 to 8, the reflectance R is 0.48%, 0.015% and 0.014% for the incident light wavelength λ of 405 nm (FIG. 6), 546 nm (FIG. 7) and 633 nm (FIG. 8), respectively. That is, reflectance R is suppressed to a lower value without regard to the wavelength range of the incident visible light.

In the present modification, by using a light absorbing layer as a first layer and by determining the physical properties of the first layer based on the admittance type of the second layer, an anti-reflection film is realized which is made up of the first layer and the second layer and which substantially completely inhibits reflection of the visible range light.

Figure 9:
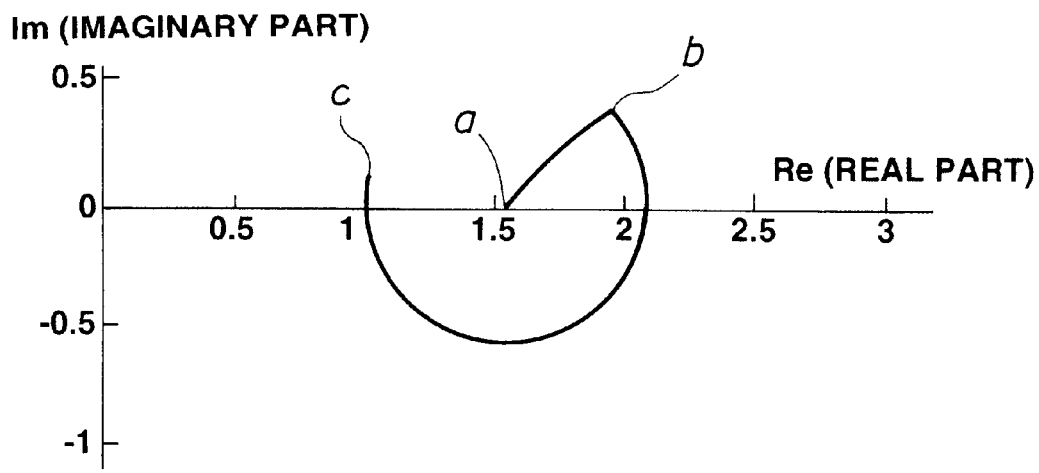
FIG. 9 is a graph showing an admittance diagram for the wavelength λ of 405 nm of a ZrN$_x$O$_y$—SiO$_2$ anti-reflection film embodying the present invention.
Figure 10:
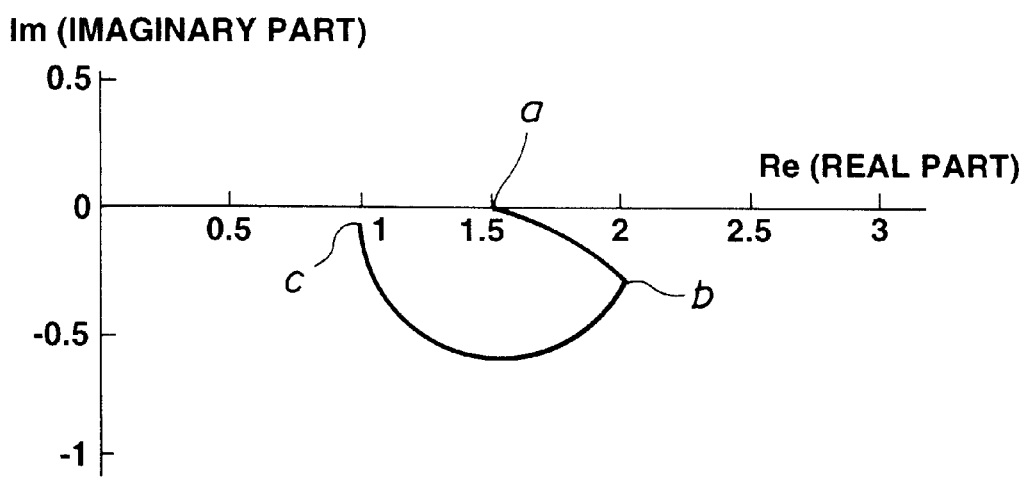
FIG. 10 is a graph showing an admittance diagram for the wavelength λ of 633 nm of the ZrN$_x$O$_y$—SiO$_2$ anti-reflection film of the present invention.

As a further modification, a dual-layer anti-reflection $ZrN_xO_y$—$SiO_2$ film made up of a first layer of zirconium oxynitride $ZrN_xO_y$ and a second layer of $SiO_2$ is explained by referring to admittance diagrams of FIGS. 9 and 10. The first layer $ZrN_xO_y$, where 0<x≦1 and 0<y≦2, is formed of a material having optical properties, which are now explained.

FIGS. 9 and 10 show admittance diagrams for λ=405 nm and for λ=633 nm, respectively. In the present modification, the first layer ($ZrN_xO_y$) and the second layer $SiO_2$ are deposited respectively on a glass substrate with the refractive index $n_0$ of 1.52 and the extinction coefficient $k_0$ of zero, to film thickness of 9.59 nm and 90.37 nm, respectively. For λ 405 nm of FIG. 9, the refractive index $n_1$ and the extinction coefficient $k_1$ of the first layer are 2.4 and 0.4, respectively, whereas, for λ=633 nm of FIG. 10, the refractive index $n_1$ and the extinction coefficient $k_1$ of the first layer are 1.72 and 1.75, respectively. As for the second layer, the refractive index $n_2$ and the extinction coefficient $k_2$ are 1.45 and zero, respectively, regardless of the wavelength. In FIGS. 9 and 10, curves from point a to point b represent the loci of movement of the admittance when the light passes through the first layer $ZrN_xO_y$, while curves from point b to point c represent the loci of movement of the admittance when the light passes through the second layer $SiO_2$.

In FIGS. 9 and 10, the reflectance R is 0.39% and 0.081% for the incident light wavelength λ of 405 nm (FIG. 9) and 636 nm (FIG. 10), respectively. That is, reflectance R is suppressed to a lower value without regard to the wavelength range of the incident visible light.

An embodiment of a dual-layer anti-reflection film $TiN_x$—$SiO_2$ employing a titanium nitride $TiN_x$ and silicon dioxide $SiO_2$ as the first and second layers, respectively, is now explained.

Titanium nitride $TiN_x$ has a refractive index $n_v$ and an extinction coefficient $k_v$ of 2.4 and 1.2 for the light with the wavelength of 450 nm, and a refractive index $n_r$ and an extinction coefficient $k_r$ of 1.7 and 1.8 for the light with the wavelength of 650 nm, as shown in Table 1, and has an admittance diagram as shown in FIG. 2.

On the other hand, if titanium oxide is present in admixture in $TiN_x$, the latter is lowered in electrical conductivity, while it is difficult to produce a stabilized system completely freed of oxygen in order to form $TiN_x$ industrially. Therefore, $TiN_x$ employed in the present modification is produced in the presence of oxygen, with the oxygen partial pressure being not higher than 50%.

Figure 11:
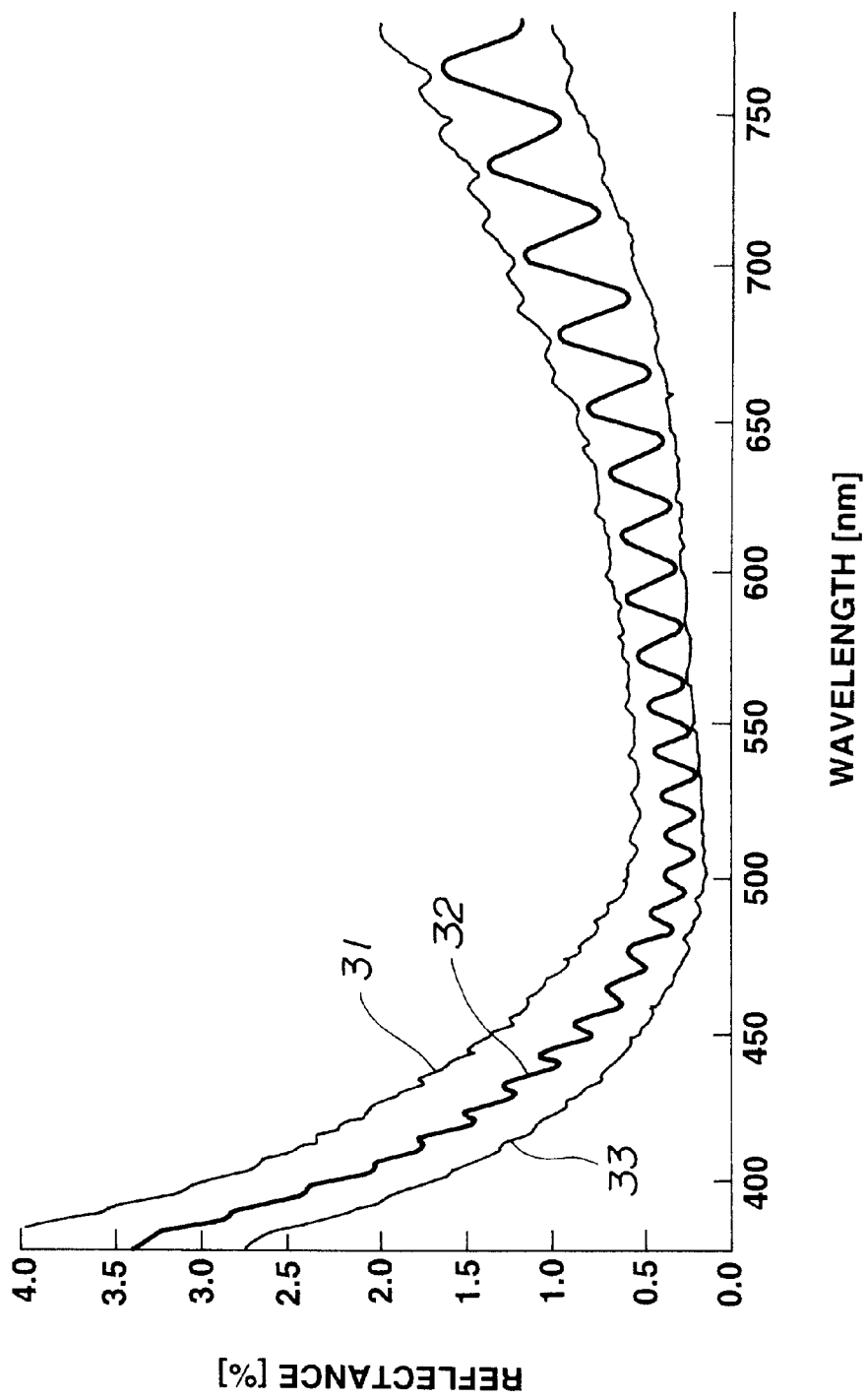
FIG. 11 is a graph showing the reflectance of the TiN$_x$—SiO$_2$ anti-reflection film embodying the present invention for different wavelengths, as found by calculations.
Figure 12:
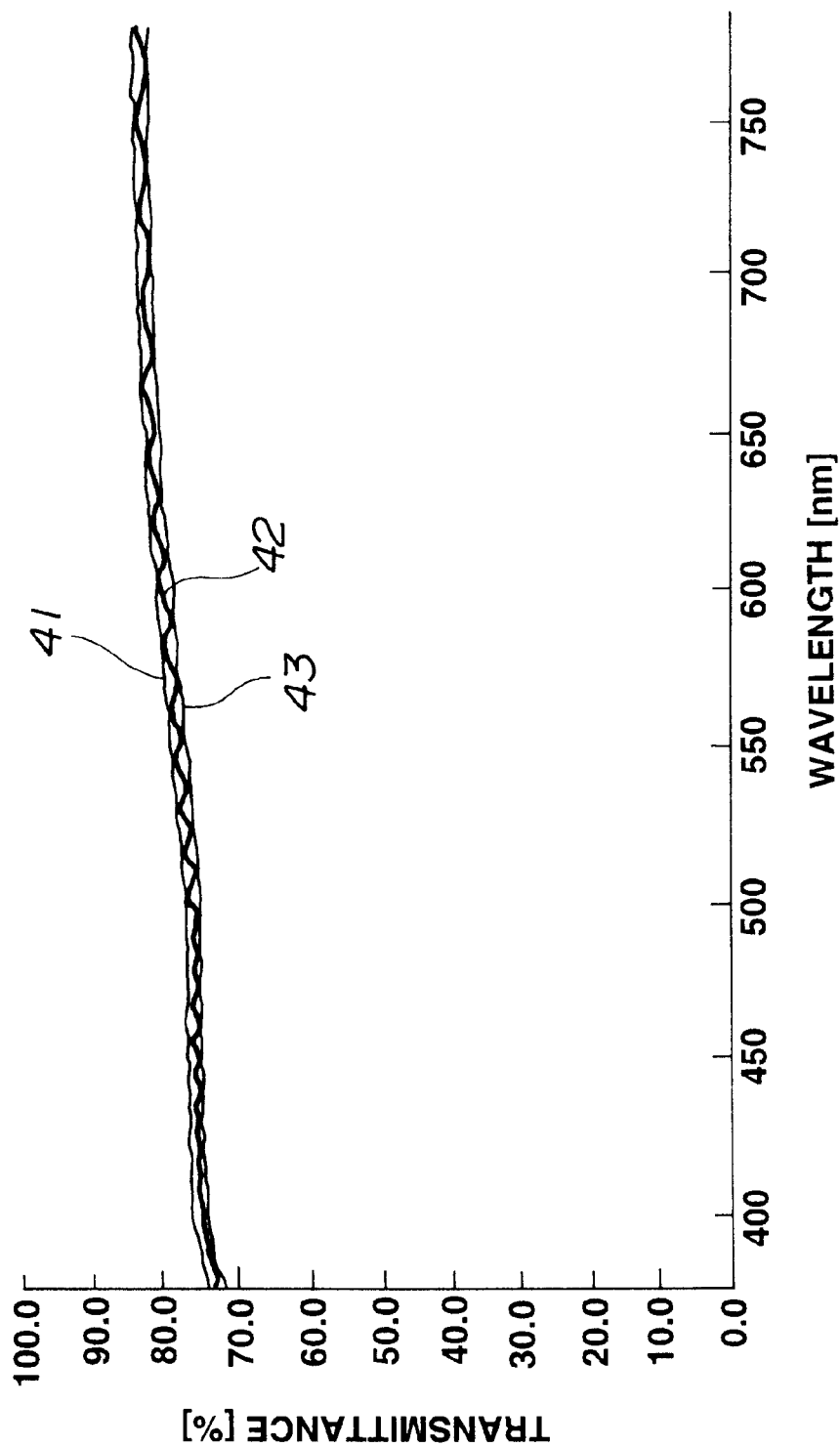
FIG. 12 is a graph showing the transmittance of the TiN$_x$—SiO$_2$ anti-reflection film of the present invention for different wavelengths, as found by calculations.

FIG. 11 shows the relation between the wavelength nm of the dual-layer $TiN_x$—$SiO_2$ anti-reflection film and the reflectance (%) based on calculated results, while FIG. 12 shows the relation between the wavelength nm and transmittance (%) based on calculated results. Although a variety of equations have been known for finding the reflectance and transmittance, basically the reflectance R for the wavelength λ and the transmittance T for the wavelength λ may be found by the following equations (4) and (5):

$$R = \left(\frac{y_oB - C}{y_oB + C}\right)\left(\frac{y_oB - C}{y_oB + C}\right) \quad (4)$$

$$T = \frac{4y_o\text{Re}(\eta_m)}{(y_oB + C)(y_oB + C)^*} \quad (5)$$

respectively.

In these equations (4) and (5), B and C may be found from the equation (2) and, for a dual-layer film, may be found from the following equation (6):

$$\begin{vmatrix} B \\ C \end{vmatrix} = \begin{vmatrix} \cos\delta_2 & i\sin\delta_2/y_2 \\ iy_2\sin\delta_2 & \cos\delta_2 \end{vmatrix} \begin{vmatrix} \cos\delta_1 & i\sin\delta/y_1 \\ iy\sin\delta_1 & \cos\delta_1 \end{vmatrix} \begin{vmatrix} 1 \\ y_m \end{vmatrix} \quad (6)$$

In the equation (6), δ=2πNd cos θ/λ. For the present calculations, θ=0. The complex refractive index $n_2$ of the second layer is 1.45, which corresponds to $y_2$. The complex refractive index $N_1$ of the first layer is $n_1$-i$k_1$, which corresponds to $y_1$. The optical admittance of the substrate is $y_m$, which is 1.52 for the glass substrate.

The film thickness for which the reflectance with the incident light wavelength on the short wavelength side becomes equal to zero is now derived. The film thicknesses of the first and second films are defined as $d_1$ and $d_2$, respectively.

The condition under which the reflectance becomes equal to zero is shown by the equation (7):

$$Y(d_1, d_2) = C_2/B_2 = 1 \tag{7}$$

wherein $d_1$, $d_2$ are film thicknesses of the first and second layers, respectively, which $C_2$, $B_2$ are found by substituting $C=C_2$, $B=B_2$ into the equation (6). The angle $\delta_1$ of the first layer and the angle $\delta_2$ of the second layer are represented by the following equations (8) and (9):

$$\delta_1 = 2\pi y_1 d_1/\lambda \tag{8}$$

$$\delta_2 = 2\pi y_2 d_2/\lambda \tag{9}$$

In the embodiments of FIGS. 11 and 12, the structure shown in FIG. 1B is presupposed. That is, an acrylic resin functioning as a hard coating layer 12 is coated to a thickness of approximately 6 nm on a polyethylene terephthalate (PET) film, with a thickness of 188 nm, functioning as a supporting layer 11, and a $TiN_x$ operating as the first layer 1 and $SiO_2$ operating as the second layer 2 are deposited to a thickness of 10 nm and 80 nm, respectively.

In FIG. 11, reflectance R (%) for the wavelength $\lambda$ (nm) is found for 100 samples having a thickness conforming to Gaussian distribution at 1 $\sigma$ of 2% with respect to the above thickness in consideration of thickness fluctuations of the $TiN_x$ at the time of manufacture in order to find an upper limit value, a lower limit value and a mean value, which are indicated as an upper limit value curve 31, a mean value curve 32 and a lower limit value curve 33, respectively. FIG. 11 shows a design margin in which, if the thickness of the $TiN_x$ and $SiO_2$ layers are fluctuated on the order of 2% at the time of manufacture, the optical properties of the anti-reflection film are confined in a range between the upper limit value curve 31 and the lower limit value curve 33. The mean value curve 32 exhibits ripple caused by light interference from the hard coating layer.

In FIG. 12, the light transmittance assumes different values depending on the thickness of the $TiN_x$ layer, as in FIG. 11. Thus, FIG. 12 shows an upper limit value curve 41, a mean value curve 42 and a lower limit value curve 43 in the Gaussian distribution for 100 samples with 1 $\sigma$ equal to 2% thickness variation.

FIGS. 11 and 12 indicate that the ($TiN_x$—$SiO_2$) anti-reflection film may be satisfactorily applied as a reflection inhibiting film for a CRT for which a drastically low reflectance or a drastically flat wavelength to light transmittance curve are not required, and that an anti-reflection film for CRT may be realized by a dual-layer film.

Figure 13:
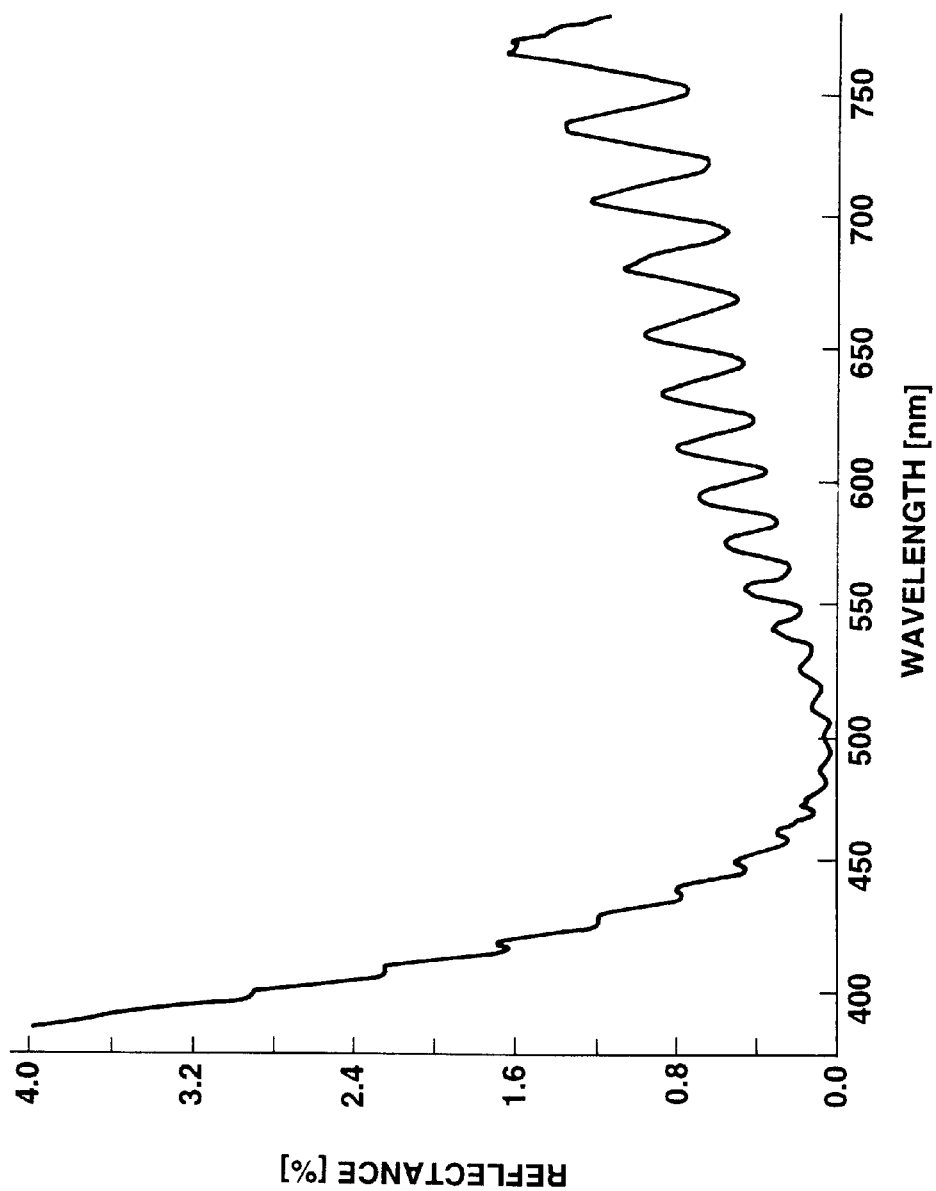
FIG. 13 is a graph showing the reflectance of the TiN$_x$—SiO$_2$ anti-reflection film of the present invention for different wavelengths, as found by measurements.

FIG. 13 shows the relation between the wavelength (nm) and the reflectance (%) of the ($TiN_x$—$SiO_2$) anti-reflection film, as found by measurements. It is seen from FIG. 13 that, since a curve similar to one given by the above calculated values has been obtained, the ($TiN_x SiO_2$) anti-reflection film represents a desirable embodiment. Moreover, the sheet resistance of the $TiN_x$ layer is 237 ohms/square, which is a value about one-fourth the typical sheet resistance value of 1000 ohms/square capable of suppressing electro-magnetic waves liable to be produced from the front surface of the CRT, meaning that an improved shielding anti-reflection film may be produced.

Figure 14:
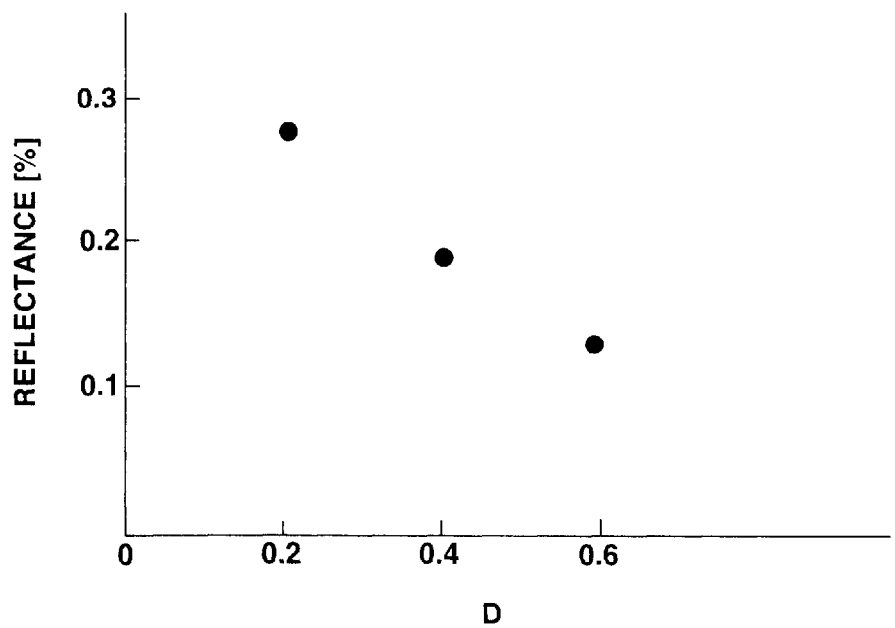
FIG. 14 is a graph for illustrating the relation between the reflectance and a distance between the refractive index/extinction coefficient on the low range side and the refractive index/extinction coefficient of the high range side for the anti-reflection film according to the present invention.

The range of practical utilization of the anti-reflection film is checked from the relation shown in equation (3). For this checking, the following relationships shown by the equations (10 and (11):

$$n_v > n_r + D \tag{10}$$

$$k_r > k_v + D \tag{11}$$

are used. In these equations (10) and (11), "D" denotes the distance between $n_v$ and $n_r$ or the distance between $k_v$ and $k_r$. FIG. 14 shows the relation between D and calculated average values of reflectance. If, with the refractive index $n_v$ and the extinction coefficient $k_v$ at short the wavelength $\lambda_v$, the refractive index $n_r$ for the long wavelength $\lambda_r$ is assumed to be $n_v - D$, while the extinction coefficient $k_r$ is assumed to be $k_v + D$. Some values of each of $n_v$, $k_v$ and D are selected in order to find reflectance and a mean value is found for the same value of D.

Specifically, if $\lambda_v = 450$ nm, $\lambda_r = 650$ nm, the refractive index $n_v$ at the wavelength $\lambda_v$ is set to 0.7, 1.5 and 2.5, the extinction coefficient $k_v$ is 1.0 and 4.0, and D is set to 0.2 for each of the refractive index $n_v$ and the extinction coefficient $k_v$ for the short wavelength, the refractive index $n_r$ for the long wavelength is 0.5, 1.3 and 2.2 from $n_v - 0.2$, while the extinction coefficient $k_r$ is 1.2 and 4.2 from $k_v + 0.2$. By finding the reflectance for the six sets of combinations and finding an average value, the mean reflectance 0.28 for D=0.2 may be found. Similarly, the mean reflectance 0.19 for D=0.4 and the mean reflectance 0.13 for D=0.6 are found. FIG. 14 shows the relation between D and the reflectance thus found.

FIG. 14 shows that, if the reflectance suppressing effect of not more than 0.2 is the range of practical utilization of the anti-reflection film, it is most useful in demonstrating the effect of the present invention to constitute the first layer of the anti-reflection film by a film having a value of D larger than 0.4, that is by a film having the refractive index n and the extinction coefficient k satisfying the equations (12) and (13):

$$n_v > n_r + 0.4 \tag{12}$$

$$k_r > k_v + 0.4 \tag{13}$$

That is, it suffices to design the dual-layer film by setting the refractive index $n_v$ and the extinction coefficient $k_v$ on the short wavelength side and the refractive index $n_r$ and the extinction coefficient $k_r$ on the long wavelength side for satisfying the above condition.

With the above structure of the anti-reflection film, high electrical conductivity and high anti-reflection effect may be realized over a wide frequency range despite the simplified structure of the dual film, thus prohibiting static charges or electro-magnetic waves from being outputted from an optical substrate on which is affixed the anti-reflection film.

Figure 17:
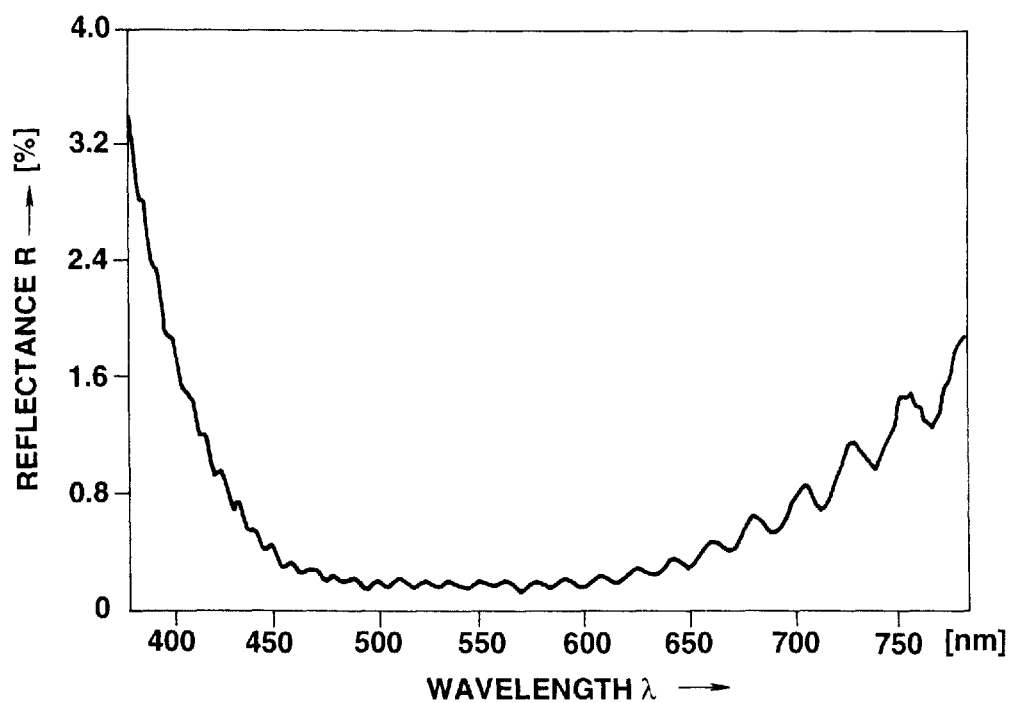
FIG. 17 is a graph showing the reflectance in relation to the wavelength of the TiN$_x$(W)—SiO$_2$ anti-reflection film of the present invention, as found by measurements.
Figure 15:
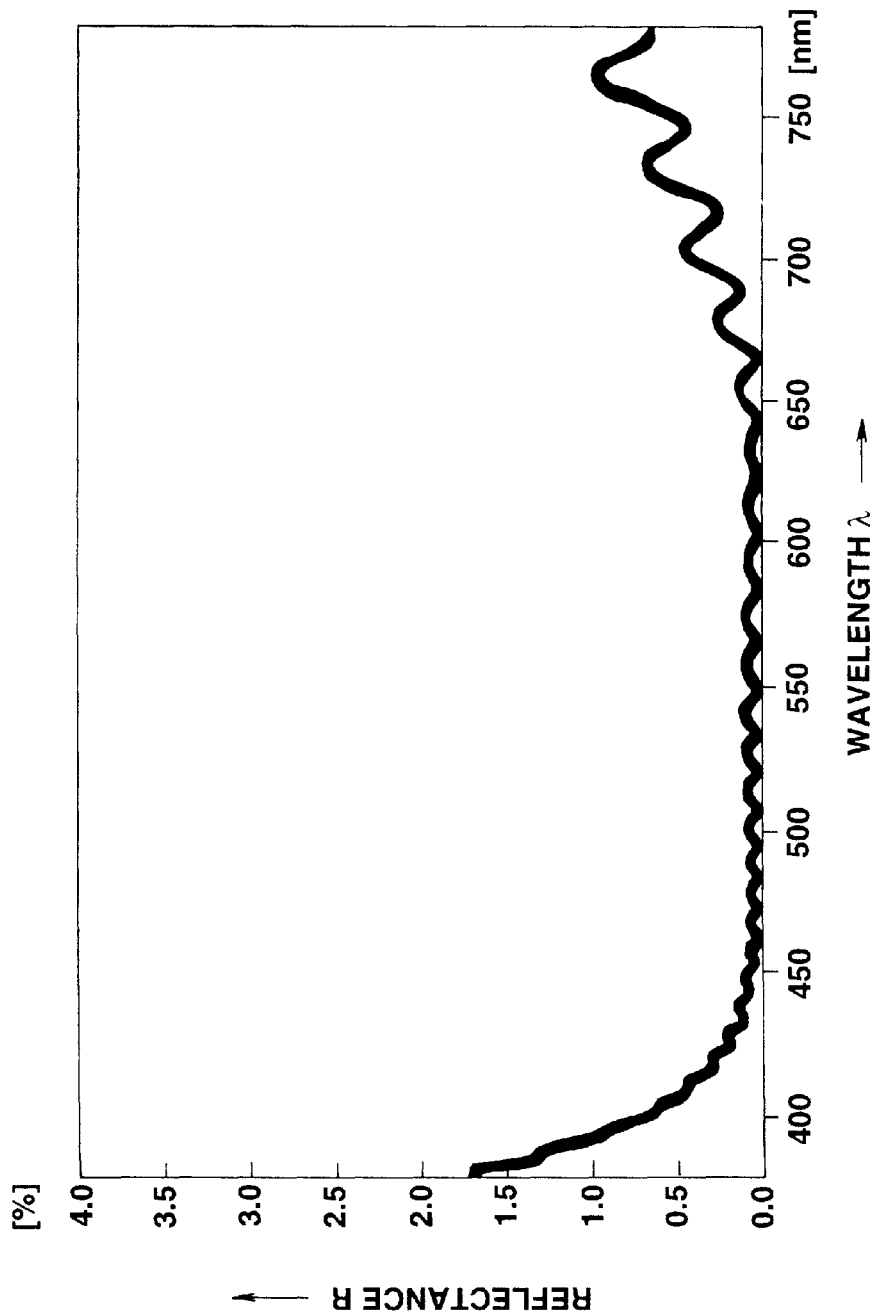
FIG. 15 is a graph showing the reflectance in relation to the wavelength of the TiN$_x$(W)—SiO$_2$ anti-reflection film embodying the invention.
Figure 16:
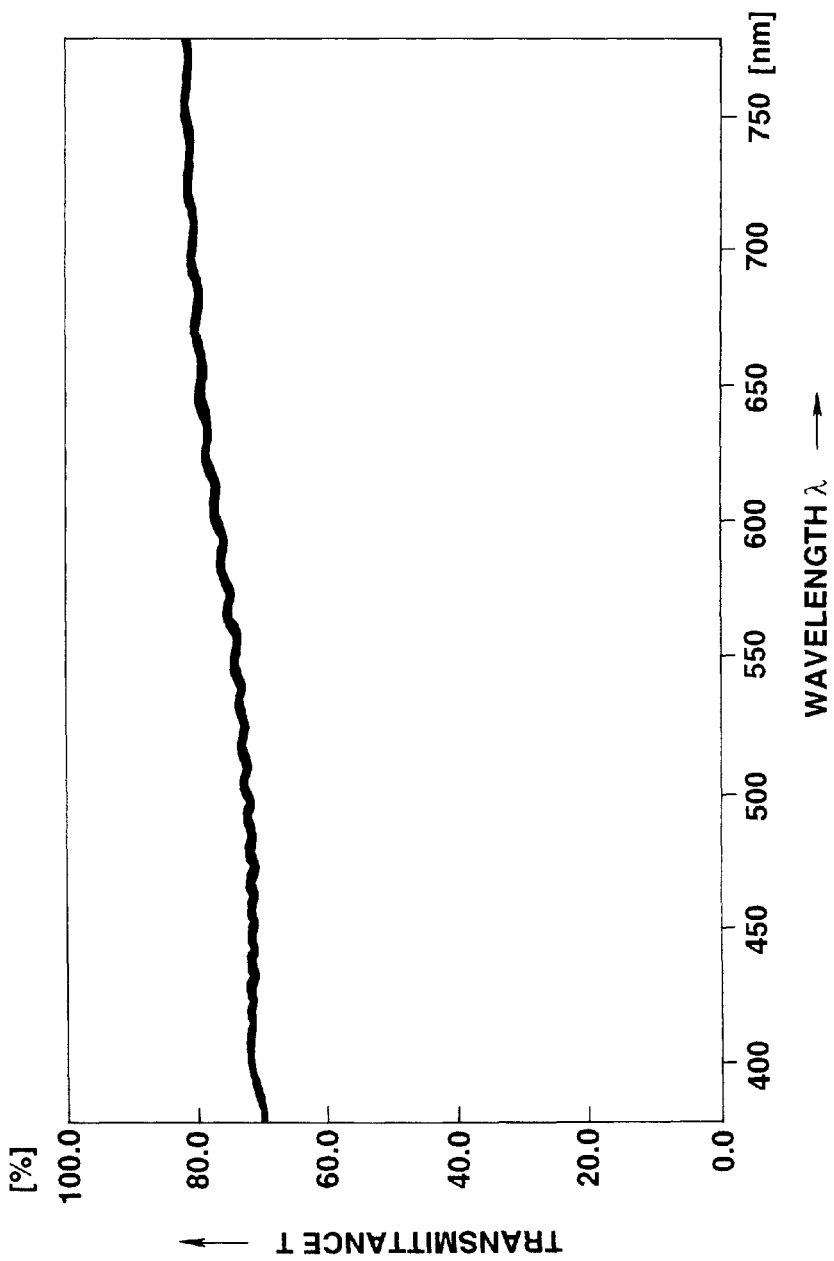
FIG. 16 is a graph showing the transmittance of the TiN$_x$(W)—SiO$_2$ anti-reflection film of the present invention in relation to the wavelength, as found by calculations.

Referring to FIGS. 15 to 17, the optical properties of a dual-layer anti-reflection film of $TiN_x(W)$—$SiO_2$, having a film of titanium nitride being doped with tungsten W, as a first layer, and also having a film of $SiO_2$ as a second layer, will now be explained. In the present embodiment, the dual-layer film is deposited via a hard coat layer of an acrylic resin on a polyethylene terephthalate (PET) substrate. The optical properties of the PET layer include the refractive index n of 1.50, 1.48, 1.46, 1.47, 1.48 and 1.50 for the wavelengths $\lambda$ of 400 nm, 430 nm, 550 nm, 650 nm, 700 nm and 750 nm, respectively, with the extinction coefficient k being zero for all of the wavelengths. The first layer $TiN_x$(W) has a refractive index n of 2.50 and an extinction coefficient k of 0.73 for the thickness of 9.72 nm and the wavelength $\lambda$=405 nm, with n=1.55 and k=1.735 for $\lambda$=632.8 nm. As for the second layer of $SiO_2$, n=1.45 and k=0 for the thickness of 84.28 nm and the wavelength $\lambda$=546 nm.

FIG. 15 shows values of the reflectance R versus the incident light wavelength $\lambda$, as calculated from the equation (4). FIG. 16 shows the calculated values as found from the equation (5).

FIG. 17 shows the measured values of the reflectance R versus the wavelength $\lambda$ of the dual-layer anti-reflection film as tentatively produced under the above conditions. FIG. 17 shows that a dual-layer film obtained by doping $TiN_x$ with tungsten is effective to prevent reflection of light over a wide frequency range of from approximately 450 nm to 650 nm.

By adjusting the film thickness, blue reflected light can be accentuated, while red reflected light can be attenuated. This indicates that, if the dual-layer film is used as an anti-reflection film, the reflected light from the CRT display can be white slightly tinted with blue or purple. Such reflected colors are commonly desirable for CRT display purposes.

With the above construction of the anti-reflection film, an anti-reflection film may be provided which, despite its simple dual-layer construction, is high in electrical conductivity and in anti-reflection ratio over a wide frequency range, and has an improved effect in preventing static charges or electro-magnetic waves from being outputted from the surface of the optical substrate, such as a CRT.

Figure 18:
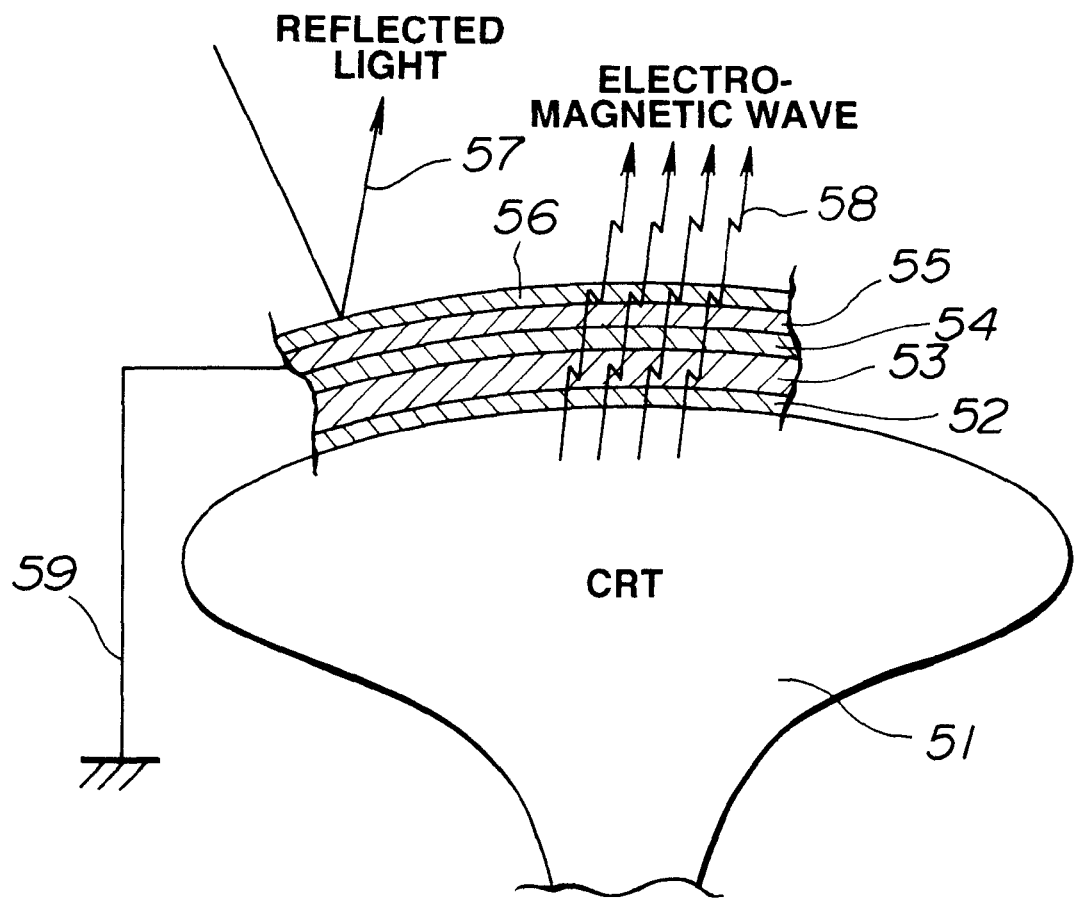
FIG. 18 schematically shows an example of an application of the anti-reflection film embodying the present invention.

FIG. 18 shows an instance in which the above-described dual-layer anti-reflection film is applied on a CRT 51. Referring to FIG. 18, there is formed on a glass plate on the display surface of the CRT 51 a PET film 53 via a UV-cured resin 52, and an anti-reflection film 55 formed by the above-described dual-layer film is applied via a hard coat layer 54 on the PET film 53. An anti-contamination coating layer 56 is deposited, if need be, on the anti-reflection film 55. It is possible with such structure to suppress the reflected light 57 on the screen surface substantially to zero and preventing an electro-magnetic wave 58 from being radiated from the inside of the CRT. By electrically grounding an electrically conductive layer of the anti-reflection film 55 by a grounding wire 59, static charges may be inhibited, while the electro-magnetic wave shielding effect may be improved further.

Although an anti-reflection film is applied to a PET film and the resulting assembly is tightly affixed to the surface of the display device so as to be used as an anti-reflection film for the CRT surface, this is not limitative of the present invention. For example, the anti-reflection film may be directly applied to the CRT surface, while the film may be used for the surface of the optical substrate, such as a platen of a copying machine or a cover glass for an equipment. The anti-reflection film may be transiently applied to the surface of the PET film which is then intimately affixed to the surface of the optical substrate, or the anti-reflection film may be directly deposited on the optical substrate surface.

Although the PET film is used in the above embodiments as a supporting layer, this is not limitative and a vitreous supporting layer may also be employed.

Although an ITO—Au layer is used in the above embodiment as a first layer, that is as a layer of a metal material admixed with an electrically conductive oxide, this is not limitative and a metal material admixed with another electrically conductive oxide may also be employed.

In addition, although the second layer is a layer of silicon dioxide in the above embodiment, this again is not limitative and a material having a refractive index of not more than 2.0, such as magnesium difluoride $MgF_2$ with a refractive index n=1.38, may also be employed for achieving the results of the present invention.

We claim:

1. An anti-reflection film deposited on a supporting layer, said film consisting essentially of two layers with a first layer being deposited on the supporting layer and a second layer deposited on the first layer, said first layer being an electrically conductive material absorbing light and said second layer being a material having a refractive index not higher than 2.0, said first layer for a wavelength $\lambda_v$ having a refractive index $n_v$ and an extinction coefficient $k_v$ and for a wavelength $\lambda_r$ longer than the wavelength $\lambda_v$, said first layer having a refractive index $n_r$ and an extinction coefficient $k_r$ with $n_v$ being larger than $n_r$ and $k_v$ being smaller than $k_r$, said first layer being selected from a group of materials consisting of $TiN_x$, $TiN_x(W)$, $TiO_2$, $TiN_xO_y$, $ZrN_xO_y$, mixtures of $TiN_xO_y$ and $ZrN_xO_y$, ITO—Au, $ZrN_x$, and mixtures of $TiN_x$ and $ZrN_x$, wherein x>0 and y>0, the anti-reflection film having anti-reflection properties for wavelengths in a range between $\lambda_v$ and $\lambda_r$ and the film providing means to prohibit static charges and electro-magnetic waves from being outputted from the supporting layer.

2. An anti-reflection film according to claim 1, wherein the supporting layer is selected from a group consisting of glass, polyethylene, terephthalate and polyethylene terephthalate with a hard coating of acrylic resin.

3. An anti-reflection film according to claim 1, wherein the second layer is selected from a group consisting of $SiO_2$ and $MgF_2$.

4. An anti-reflection film according to claim 1, wherein said first layer is titanium nitride doped with tungsten.

5. An anti-reflection film according to claim 4, wherein $n_v$ of the first layer is larger than $(n_r+0.4)$ and $k_r$ is larger than $(k_v+0.4)$.

6. An anti-reflection film according to claim 1, wherein $n_v$ of the first layer is larger than $(n_r+0.4)$ and $k_r$ is larger than $(k_v+0.4)$.

* * * * *